May 2, 1933.  H. E. SLOAN ET AL  1,906,490

CHUCKING MECHANISM

Filed Aug. 5, 1931

Patented May 2, 1933

1,906,490

UNITED STATES PATENT OFFICE

HARRY E. SLOAN, OF HARTFORD, AND GEORGE A. HIGHBERG, OF WEST HARTFORD, CONNECTICUT, ASSIGNORS TO THE CUSHMAN CHUCK COMPANY, OF HARTFORD, CONNECTICUT, A CORPORATION OF CONNECTICUT

CHUCKING MECHANISM

Application filed August 5, 1931. Serial No. 555,261.

This invention relates to mechanism for closing and opening chuck jaws for the purpose of securing work therein or for releasing it therefrom, and an object of the invention, among others, is to provide a device of this class that shall be simple in construction and particularly efficient in operation.

One form of a mechanism embodying our invention, and in the construction and use of which the objects herein set out, as well as others, may be attained, is illustrated in the accompanying drawing in which—

Figure 1 is an end view, of a somewhat diagrammatic character, illustrating our improved mechanism.

Figure 2 is a top view of the same, but in section on a plane denoted by the dotted line 2—2 of Figure 1.

Figure 3 is a view on enlarged scale in section on a plane approximately denoted by the dotted line 3—3 of Figure 1, one of the chuck spindles only being shown.

This invention is particularly applicable in machines embodying a number of chuck spindles supported on a carrier and each spindle comprising chuck jaws adapted to hold work to be operated upon in different positions at which said work is presented by the carrier, this improved device operating to open and close the chuck jaws to release and to secure work in each of the chucks when they are moved to a certain position. It is contemplated, however, that the invention may be applied to a single spindle to which a chuck is secured and that may or may not be mounted on a carrier.

Machines of this type comprising chuck spindles are well known in the art and the application of this invention will be readily understood, and for this reason the carrier for the chuck spindles is shown only as to a small section thereof and that portion of the frame of the machine as a whole that supports the chucking mechanism is similarly shown to a limited extent.

In the accompanying drawing the numeral 5 denotes a small portion of the frame that supports the chucking mechanism and 6 a small portion of the carrier that supports the chucking spindles. As before mentioned there may be such number of these spindles 7 as may be desired, such being mounted in the carrier when a number are employed. For the purpose of convenience the description herein will be confined to a single spindle, it being understood that such description will apply equally to each of a number of spindles when more than one are embodied in the machine.

A chuck is secured to the end of the spindle 7, such chuck comprising a body 8 having jaw carriers 9 with chuck jaws 10 secured thereto mounted for radial movement on the chuck body in a manner that will be readily understood. A chucking lever 11 pivotally mounted in the chuck body is engaged with each jaw carrier, said levers also being engaged with an actuator 12 located in the chuck body for reciprocating movement therein by a chucking spindle 13 to the end of which said actuator is secured. Said spindle 13 projects through the spindle 7 and has a tip 14 secured to and projecting from its end into a housing 15 secured to the end of the spindle, and as shown in Fig. 3 of the drawing. This tip is splined through a hole into said housing and has a threaded end 16 engaging a thread in an opening in a jaw actuating sleeve 17 mounted on ball bearings within the housing 15, said bearings and the sleeve being held in place by a cap 18 secured to the end of the housing. Said sleeve projects through said cap and has a collar 19 keyed to its outer end. A chucking gear 20 is secured to said collar as by means of a flanged retainer 21 screw threadedly engaged within the opening in the end of the sleeve 17, the flange of the retainer securing the collar 19 in place and the gear 20 on said collar. The gear 20 is loosely mounted on the collar 19 and has an actuating pin 22 projecting from its side to engage a lug 23 projecting from the side of the collar 19.

When force is applied to the gear 20 to close the chuck jaws the resistance of such jaws when they grip a piece of work is liable to cause a sticking adherence between the engaged threads of the tip and the sleeve 17, but when the gear 20 is rotated freely, in the starting operation the pin 22 forcibly striking the lug 23 relieves such sticking action, said gear having a partial free rotation before striking the lug.

For the purpose of operating the mechanism just described a motor 24 is mounted on the frame of the machine, the motor shaft 25 having a pinion 26 secured thereto in mesh with a gear 27 secured to a gear shifter 28.

A bracket 29 projects from a motor support 30 secured to the frame 5 and a clutch supporting pin 31 is mounted at opposite ends in the arms of said bracket for longitudinal sliding movement in said arms, a spring pressed detent 32 in one of the arms of said bracket engaging recesses in the pin for yieldingly holding it in different positions. A sleeve 33 is secured on the pin 31 and a clutch actuator 34, herein shown as integral with the shifter 28, is slidably mounted on said sleeve. A recess 35 in the side of the sleeve encloses the ends of clutch actuating arms 36, the opposite ends of said arms being mounted for rocking movement between the ends of a clutch band 37 located within the hub of a gear 38 and as shown in Fig. 3 of the drawing, said hub projecting into a recess 39 in one end of the shifter 28. A clutch expanding pin 40 projects from a plate 41 in a recess in the side of the sleeve 33, said pin projecting from said plate into the clutch actuator 34. A stop 42 projects from the pin 31 in position to engage one arm of the bracket 29 and thereby limit the movement of said pin 31, which movement is effected by a hand lever 43 pivotally mounted in the bracket 29, forks at one end of said hand lever having pins projecting in opposite directions to engage within the groove in the clutch actuator 34.

In the operation of the device as the carrier bearing the chuck spindles is rotated it is brought to rest at certain intervals of time, each time its movement ceases one of the spindles being in a position for a chucking operation; in this position such spindle being located for connection to the chucking mechanism just described. When the chuck spindle has ceased to rotate the lever 43 is actuated to move the pin 31 and the mechanism mounted thereon, this movement causing the gear 38 to mesh with the teeth of a holding gear 44 formed on the housing 15 at one end thereof. The gear 27 is also caused to engage with the teeth of the gear 20, the pinion 26 being of a length to permit sliding movement of the gear 27 sufficiently for this purpose. After the gears 38 and 27 have been completely meshed with the gears 44 and 20 the stop 42 will engage the arm of the bracket 29, thus preventing further movement of said gear. Pressure on the handle 43, however, is continued with the effect that the actuator 34 slides upon the sleeve 33 forcing the pin 40 between the ends of the arms 36, rocking said arms in their bearings in the ends of the band 37 and expanding said band into contact with the hub of the gear 38. This will hold the housing 15 and the chuck spindle against rotation, and the motor 24 being now started by any suitable mechanism, the rotation of the pinion 26 will rotate the gear 27 and through it the gear 20 and the mechanism connected therewith to loosen the chuck jaws and permit work to be removed therefrom. A new piece of work being inserted rotation of the motor in the opposite direction is effected by any suitable arrangement and the chuck jaws are tightened upon the piece of work, after which the lever 43 is operated to disengage the parts herein just described. The interval of rest of the carrier is sufficient under ordinary circumstances to enable these chucking operations to be performed, and when the parts have been disengaged as just described the carrier is free to rotate to bring another chuck spindle into position for a repetition of the operation.

We claim—

1. In combination with a chuck spindle supporting a chuck with chuck jaws movable thereon and including chuck jaw operating mechanism embodying a chucking gear, chucking mechanism including a chucking pinion, a driving gear in continuous mesh with said pinion, and means for moving said driving gear while meshed with said pinion to mesh said driving gear with said chucking gear.

2. In combination with a chuck spindle supporting a chuck with chuck jaws movable thereon and including chuck jaw operating mechanism embodying a chucking gear, chucking mechanism including a chucking pinion, a driving gear in continuous mesh with said pinion, and means for moving said driving gear while meshed with said pinion to mesh said driving gear with said chucking gear.

3. In combination with a chuck spindle supporting a chuck with chuck jaws movable thereon and including chuck jaw operating mechanism embodying a chucking gear and a holding gear, chucking mechanism including a chucking pinion, a driving gear to be driven by said pinion, a cooperating holding gear, and means for meshing said chucking gear with said driving gear and said cooperating holding gear with said holding gear.

4. In combination with a chuck spindle supporting a chuck with chuck jaws movable thereon and including chuck jaw operating mechanism embodying a chucking gear and a holding gear, chucking mechanism including a chucking pinion, a driving gear to be driven by said pinion, a cooperating holding gear, and means for meshing said chucking gear with said driving gear and by movement of the latter to mesh said holding gears one with the other.

5. In combination with a chuck spindle supporting a chuck with chuck jaws movable thereon and including chuck jaw operating mechanism embodying a chucking gear, chucking mechanism including a chucking pinion, a slidably mounted supporting pin, a driving gear rotatably mounted on said pin for operation by said pinion, and means to slide said pin to mesh said driving and chuckling gears.

6. In combination with a chuck spindle supporting a chuck with chuck jaws movable thereon and including chuck jaw operating mechanism embodying a chucking gear and a holding gear, chucking mechanism including an actuating pinion, a slidably mounted supporting pin, a driving gear rotatably mounted on said pin for operation by said pinion, a cooperating holding gear mounted on said pin, and means for applying force to said driving gear to slide said pin to mesh said driving and chucking gears and said holding gears one with the other.

7. In combination with a chuck spindle supporting a chuck with chuck jaws movable thereon and including chuck jaw operating mechanism embodying a chucking gear and a holding gear, chucking mechanism including a chucking pinion, means for connecting said pinion with said chucking gear, a slidably mounted cooperating holding gear, means for preventing rotation of said last mentioned holding gear, and means for meshing said holding gears.

8. In combination with a chuck spindle supporting a chuck with chuck jaws movable thereon and including chuck jaw operating mechanism embodying a chucking gear, chucking mechanism including a chucking pinion, means for connecting said pinion with said chucking gear, a slidably mounted cooperating holding gear, a friction band to hold said cooperating gear against rotation, and means for simultaneously expanding said band and meshing said holding gears.

9. In combination with a chuck spindle supporting a chuck with chuck jaws movable thereon and including chuck jaw operating mechanism embodying a chucking gear and a holding gear, a chucking pinion, a slidably mounted driving gear in mesh with said pinion, a cooperating holding gear, a friction band to retain said cooperating holding gear against rotation, expanders for expanding said band, means connecting said driving gear with said expanders for operating the latter, and means for meshing said driving and chucking gears and said holding gears one with the other.

10. In combination with a chuck spindle supporting a chuck with chuck jaws movable thereon and including chuck jaw operating mechanism embodying a chucking gear and a holding gear, chucking mechanism including a chucking pinion, a driving gear in mesh with said pinion, a slidably mounted supporting pin supporting said driving gear for free rotation thereon, means to permit yielding sliding movement of said driving gear, a cooperating holding gear mounted on said pin, a friction band for retaining said holding gear from rotation, expanders for said band, an operative connection between said expanders and said driving gear, a stop to limit sliding movement of said pin, and means for sliding said driving gear to mesh with said chucking gear and through said driving gear to mesh said holding gears one with the other.

11. In combination with a chuck spindle having a holding gear and containing a chucking spindle with a chucking gear secured thereto, a chucking pinion with means for rotating it, a supporting pin, a co-operating holding gear supported on said pin, a sleeve on said pin, a driving gear on said sleeve having a recess to receive the hub of said co-operating holding gear, a friction band in a recess in said co-operating holding gear, expanders positioned between the ends of said band, an expanding pin carried by said driving gear to engage said expanders, and means for sliding said driving gear to mesh it with said chucking gear and to mesh said holding gears one with the other.

12. In combination with a chuck spindle supporting a chuck with chuck jaws movable thereon and including a chucking gear, chucking mechanism including a chucking pinion, a shaft held from longitudinal movement and to which said pinion is secured, means for rotating said shaft, a driving gear in continuous mesh with said pinion, and means for moving said driving gear while meshed with said pinion to mesh said driving gear with said chucking gear.

13. In combination with a chuck spindle supporting a chuck with chuck jaws movable thereon and including chuck jaw operating mechanism embodying a chucking gear, chucking mechanism including a chucking pinion, a shaft held from longitudinal movement and to which said pinion is secured, means for rotating said shaft, a driving gear in constant mesh with said pinion, and means for moving said driving gear while meshed with said pinion to mesh said driving gear with said chucking gear.

14. In combination with a chuck spindle supporting a chuck with chuck jaws movable thereon and including chuck jaw operating mechanism embodying a set of gears comprising a chucking gear and a holding gear, chucking mechanism including a chucking pinion, a set of gears comprising a driving gear to be driven by said pinion and a cooperating holding gear, and means for moving one of said sets of gears into mesh with the members of the other set of gears.

HARRY E. SLOAN.
GEORGE A. HIGHBERG.